June 29, 1926.
F. S. SPRINGSTEAD
AUTO SIGNAL
Filed March 10, 1922
1,590,262
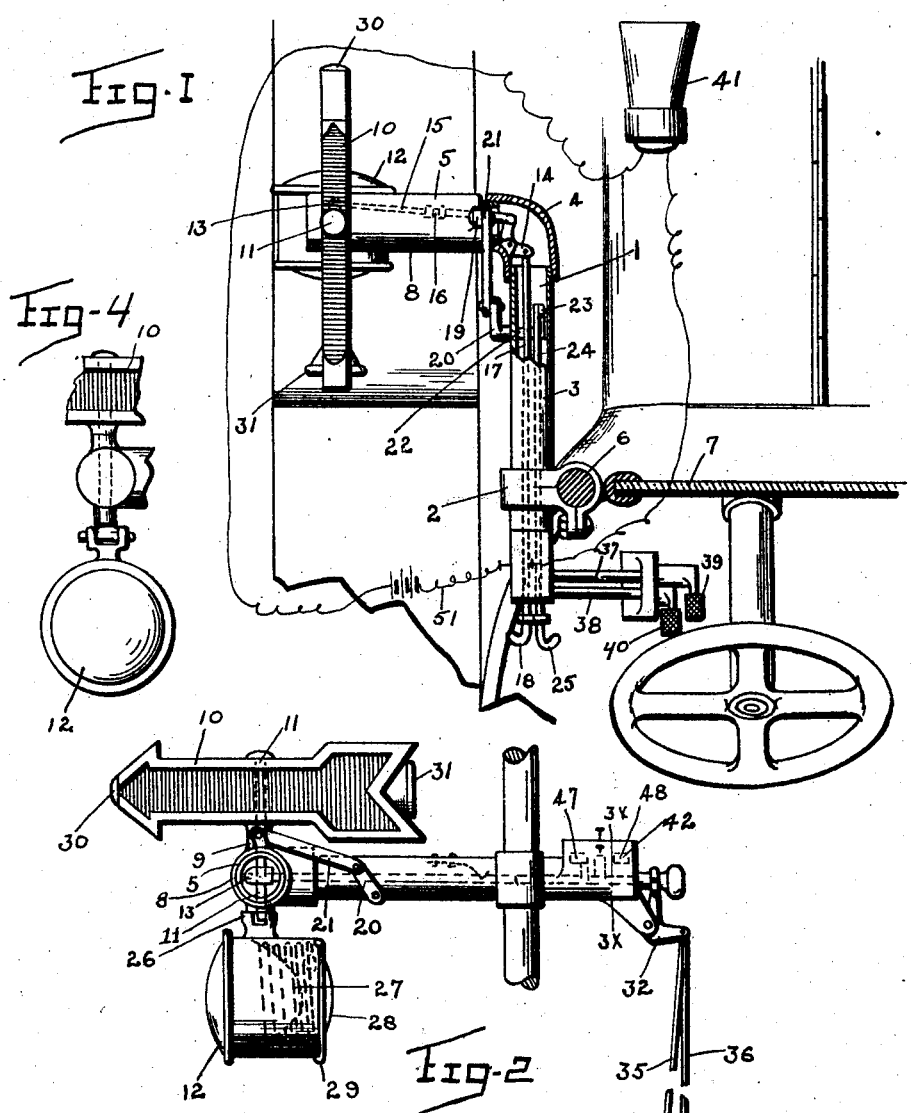
INVENTOR.
FRANKLIN S. SPRINGSTEAD
BY
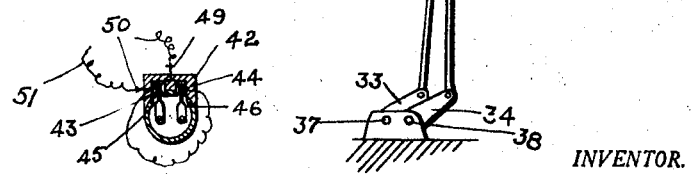
ATTORNEYS.

Patented June 29, 1926.

1,590,262

UNITED STATES PATENT OFFICE.

FRANKLIN S. SPRINGSTEAD, OF ROCHESTER, NEW YORK.

AUTO SIGNAL.

Application filed March 10, 1922. Serial No. 542,625.

The object of this invention is to provide a new and improved type of combination sound and light signal and trouble lamp.

This and other objects of this invention will be fully illustrated in the drawing, described in the specification and pointed out in the claim at the end thereof.

In the accompanying drawing:

Figure 1 is a top plan view of the signal and partial section of a portion of an automobile showing the signal mounted in place thereon.

Figure 2 is a side elevation of the signal and parts for operating the same.

Figure 3 is a vertical sectional view of the switch for simultaneously operating the sound signal with the indicator and light signal.

Figure 4 is a detail view of a modified connection between the spot light and the indicator.

In the several figures of the drawing like reference numerals indicate like parts.

The signal forming the subject matter of this invention is made up of the L shaped tubular bracket 1. This bracket is clamped to project forwardly and outwardly in a horizontal plane from the windshield to which it is fastened by means of the clamp 2. The L shaped bracket is formed by the long forwardly projecting tube 3 having the elbow 4 attached to the outer end thereof from which the shorter outwardly projecting tube 5 is supported. The clamp 2 is provided on the tube 3 and rigidly supports the whole of the bracket on the upright 6 of the windshield 7.

Mounted on the outwardly projecting tubular section 5 of the L shaped bracket 1 is a sleeve 8 which is adapted to turn thereon. On this sleeve is provided the standard 9 which is adapted to support the arrow shaped casing 10 forming the indicator proper. The casing forming the indicator 10 is fastened to the pivot stud 11 mounted to rotate in the standard 9. The stud 11 projects also through the sleeve 8 and tubular section 5 and has anchored to its lower end the spotlight 12.

Inside of the tubular section 5 the pivot stud 11 is provided with an arm 13. In the elbow 4 of the bracket 1 is pivoted the bell crank 14 and one side of this bell crank is connected with the arm 13 on the pivot stud 11 by means of the link 15. The link 15 is made up in two sections which are joined together with the swivel connection 16 for a purpose that will presently appear.

The bell crank 14 has also the link 17 connected thereto and this link which passes through the tubular section 3 of the bracket projects out of the end of the bracket and has the handle 18 attached thereto by means of which the signal or indicator may be operated. This is done by pulling out on the handle 18 to rock the bell crank 14 to the right and in doing so pulls the arm 13 on the pivot stud 11 to the right so that the casing 10 or indicator proper is swung in a horizontal plane to point to the right to indicate that the car is about to turn to the right. When it is desired to make the indicator point to the left the handle 18 is pushed in which rocks the bell crank 14 and arm 13 to the left and swings the casing 10 to point to the left. It will be understood that the arc through which the indicator of the signal can be swung will be less than 180 degrees in order to avoid a dead centering of the link 15 with the arm 13. The position of the indicator casing when pointing either to the right or the left will, therefore, not be parallel to the outwardly projecting section 5 of the bracket but will be at a slight angle thereto.

In order to indicate that the car is about to stop the indicator 10 is swung from a horizontal to a vertical position. This is made possible by the sleeve 8 which is mounted to turn on the tubular section 5 of the bracket 1. On the inner end of the sleeve 9 is provided the arm 19 which projects upwardly therefrom and is connected with the arm 20 by means of the link 21. The arm 20 is carried on the outer end of the shaft 22 and this shaft is mounted to rotate in a suitable bearing in the tubular section 3 of the bracket from which it projects on one side thereof. On the inside of the section 3 of the bracket the shaft 22 has the arm 23 fastened thereto. The arm 23 has the link 24 fastened thereto and with this link the arms 23, 20 and 19 can be rocked in order to rotate the sleeve 8. The link 24 is mounted to slide in the tubular section 3 of the bracket 1 parallel to the link 17 and the outer end of the link 24 projects out of the end of the bracket 1 and has the handle 25 provided thereon by means of which the signal may be operated to indicate that the car is about to stop. When, therefore, the handle 25 is pulled rearwardly away from the end of the bracket 1 the arms 19, 20 and 23 are rocked rearwardly and turn the sleeve 8 so as to move the casing or indicator 10 from a horizontal to a vertical position. The indicator then points vertically into the air. A forward motion given to the handle 25 moves the indicator back to its normal horizontal position by rocking the sleeve 8 back again. The swivel joint 16 in the link 15 permits the turning of the outer end of the link 15 when the indicator is rocked in a vertical plane without interfering with the mechanism for operating the signal in a horizontal plane as above pointed out.

The spotlight 12 mounted to the lower end of the pivot stud 9 moves with the indicator whenever it is operated, thus when the indicator is turned to the right or left the spotlight 12 is turned with it. Thus at night when it is desired to throw the light from the spotlight to a particular point on one or the other side of the road it may be done by operating the indicator to point in the desired direction as above described and this will move the spotlight so as to throw its light in the same direction.

The spotlight is connected to the pivot pin 11 by means of a suitable connection such as the bayonet joint 26 illustrated in Figure 2. When it is desired to use the spotlight as a trouble lamp the bayonet joint 26 may be disconnected and the extension cord 27 attached in its place. The extension cord is normally stored in the rear of the spotlight casing which is closed by the mirror 28. This mirror is hinged to the rear of the spotlight and is provided with a suitable catch 29 with which it is locked to the rear of the spotlight.

For the purpose of using the indicator casing as a parking light a white lens 30 is mounted at the front or point of the indicator while at the rear of the indicator a red lens 31 is provided. Thus at night when the car is parked all of the lights except the lights throwing light through the front and rear of the indicator may be turned out leaving a red and white light visible on the side of the car to indicate the position and location thereof. The casing 10 forming the indicator may have electric lights mounted in it and the sides are preferably made transparent so that the indicator can be made visible at night and be used to indicate at night.

In order to make the signal operative with the foot a pair of bell cranks 32 are mounted on the under side of the outer end of the bracket 1. These bell cranks are suitably connected to the handles 18 and 25 so that on the rocking of the bell cranks these handles can be pulled out or pushed into the bracket 1 to operate the signal. The bell cranks 32 are connected with a pair of arms 33 and 34 by means of the links 35 and 36 respectively. The arms 33 and 34 are mounted on the end of the shafts 37 and 38 respectively and these shafts have the foot pedals 39 and 40 with which the shafts 37 and 38 can be rocked to rock the bell cranks 32 and operate the signal to point in the desired direction.

In addition to showing or indicating the direction in which the car is about to turn or indicate that the car is about to stop or slow down, the sound signal is operated at the same time. This attracts the attention of the driver of a following vehicle to the fact that the indicator is being operated so that he cannot miss seeing the same.

For this purpose the sound horn 41 is provided with an auxiliary electric circuit that is controlled by the sliding switch 42. This switch comprises a suitable casing or block in which a pair of parallel inverted channels 43 and 44 are provided. The switch is located at the end of the bracket 1 and is suitably fastened to the top of it so that the inverted channels 43 and 44 are located directly above and parallel to the links 17 and 24. The tubular bracket is cut away at the point where the switch 42 is attached to it and each of the links 17 and 24 are provided with an upwardly projecting contact finger 45 and 46 respectively which finger projects up from the links into their corresponding channels in the switch 42. In each of the channels are suitably mounted two pairs of spring contacts 47 and 48. The spring contacts on the inner side of each of the channels are electrically connected to the terminal post 49 and the spring contacts on the outer side of the channels are electrically connected to the terminal post 50. The contact fingers 45 and 46 are located between each pair of spring contacts 47 and 48 in their respective channels and normally do not make contact with either one or the other of these contacts.

When the signal is operated, however, either by pulling out or pushing in one of the links 17 or 24 through their respective handles 18 and 25, the spring finger of the link which is being operated is moved between a pair of the spring contacts and completes the electric circuit 51 which operates the sound horn 41. In this way no matter in which direction the indicator is being moved the sound horn will be operated simultaneously with it to attract attention to the operation of the signal.

The electric circuits for lighting the signal and spotlight and for operating the horn are provided with suitable controlling switches that are conveniently located either on the dash or steering wheel. This permits the driver to break or close any one of these circuits as desired.

I claim:

In an automobile signal the combination of an angularly shaped tubular bracket, a sleeve mounted to rotate on the outer end of said tubular bracket, an arm carried by said sleeve, an operating rod mounted to slide in said tubular bracket, means connecting said operating rod with said arm to rock said arm and its sleeve on the sliding of said operating rod, an indicator pivoted on the periphery of said sleeve, a second operating rod mounted to slide alongside said first sliding rod within said tubular bracket, and means connecting said second operating rod with said indicator to independently turn said indicator on the sliding of said second operating arm.

In testimony whereof I affix my signature.

FRANKLIN S. SPRINGSTEAD.